United States Patent Office 3,849,361
Patented Nov. 19, 1974

3,849,361
METHOD OF PREPARING WATER-DISPERSABLE POLYMER COMPOSITIONS
Maurice L. Zweigle, Midland, Mich., assignor to The Dow Chemical Company, Midland, Mich.
No Drawing. Filed Aug. 10, 1973, Ser. No. 387,411
Int. Cl. C08f 45/34
U.S. Cl. 260—33.2 R                              7 Claims

ABSTRACT OF THE DISCLOSURE

Microdisperse suspensions of water-soluble or water-dispersible polymers, wherein the polymer is in the internal aqueous phase of a water-in-oil suspension or emulsion and the external phase is a liquid hydrocarbon or chlorohydrocarbon are dehydrated by azeotropic distillation. The resulting microdisperse suspension of polymer is mixed with a liquid water-soluble polyglycol or polyglycol ether and the hydrocarbon or chlorohydrocarbon suspending medium is recovered by distillation to provide a fluid, microdisperse suspension of polymer which is readily dispersible in water.

BACKGROUND OF THE INVENTION

Water-soluble, high molecular weight polymers such as polyacrylamides, polyacrylic acid salts, polystyrene sulfonates, aminoalkyl acrylates and methacrylates and the like have found a wide variety of uses, for example, as flocculants in the mining industry and in sewage treatment, as mobility control agents in secondary oil recovery and as dry strength and filler retention aids in papermaking. When a controlled degree of cross-linking is introduced into such polymers they can be rendered water-insoluble while remaining water-dispersible and having a high degree of swellability in aqueous fluids. These latter water-swellable polymers have been found useful as thickeners for latex paint, as water binders in fire-fighting and as sealants for porous earth structures.

For many uses of water-soluble or water-swellable polymers, serious problems have been encountered in preparing aqueous solutions or dispersions, respectively, of such polymers because of the fact that when dry powdered polymer is added to water there is a tendency for the polymer to agglomerate in lumps or "slubs" which become covered with a highly viscous skin and thereafter dissolve or disperse only very slowly. Various mechanical devices have been proposed for achieving rapid wetting and dispersion of the individual particles of polymer to obtain efficient solution or dispersion by avoiding the lumping and skinning problems. However, such mechanical devices may be uneconomic for small users and difficult to transport for transient field use.

U.S. Pat. 3,468,322 discloses a method of dispersing water-soluble or water-swellable polymers in water by first dispersing the dry polymer in a nonsolvent for the polymer such as a liquid hydrocarbon, alcohol, glycol ether or polyglycol and feeding the resulting slurry into water by means of a mixing apparatus. However, such slurries must generally be prepared immediately before use since the solid polymer will settle and become compacted so that redispersion is a difficult or impossible unless additional agents are added to stabilize the slurry as taught in U.S. Pat. 3,666,707 or in the application of Katzer et al., Ser. No. 816,076, filed Apr. 14, 1969, now U.S. Pat. 3,763,071.

Another approach to this problem is presented in U.S. Pat. 3,624,019 wherein water-soluble polymer is prepared as a microdisperse constituent of the internal phase of a water-in-oil emulsion and the latter is inverted into water with the aid of a surfactant. By proper choice of surfactants good dispersion and rapid solution of the polymer are obtained by this emulsion inversion method. Such water-in-oil emulsions, however, are generally made up in a hydrocarbon or chlorohydrocarbon external phase which when used may constitute an ecological hazard. It would be desirable to have available compositions which disperse readily in water without forming undesirable residues therein. This desirable end can be accomplished by the use of certain water-soluble, liquid polyglycols or polyglycol ethers as the external phase for a microdisperse suspension of dry polymer. Such suspensions, however, are difficult or impossible to prepare by direct mechanical or emulsion polymerization techniques so that an indirect method of preparation is required.

SUMMARY OF THE INVENTION

In accordance with the present invention, there is provided a method for preparing fluid water-dispersible suspensions of dry particles of water-soluble or water-swellable polymers in certain liquid polyglycols and polyglycol ethers. In this method, the polymers, prepared in the aqueous phase of a microdisperse suspension of aqueous droplets in a hydrocarbon or chlorinated hydrocarbon, are dehydrated, while retaining their microdisperse condition, by azeotropic distillation of water from said suspension followed by addition of a suitable liquid polyglycol or polyglycol ether and recovery of the hydrocarbon or chlorinated hydrocarbon by further distillation under controlled conditions. It is among the advantages of the invention that the polymers can be maintained in microdisperse condition while the initial hydrocarbon or chlorinated hydrocarbon suspension medium is displaced and recovered. It is a further advantage that the resulting suspension in the polyglycol or polyglycol ether is adapted to be mixed rapidly with water to produce with only minimal agitation a homogeneous solution of water-soluble polymer or a homogeneous dispersion of water-swellable polymer depending upon the particular polymer originally employed.

The microdisperse suspensions of polymer in aqueous droplets suspended in a liquid hydrocarbon or chlorinated hydrocarbon, employed as starting materials in the practice of the present invention, may be prepared in known manner, for example, according to the procedures of U.S. Pat. 2,982,749 or 3,284,393. For the purposes of preparing the water-dispersible compositions produced in the present invention, it is desirable to adjust the conditions so as to prepare suspensions having particle sizes in the lower end of the range of the 2,982,749 patent or in the upper ranges of the materials prepared in accordance with U.S. 3,284,393. Preferably, the conditions are adjusted so as to produce suspensions in which the suspended aqueous phase contains droplets having maximum diameters of about 50 microns and preferably such as to provide a major proportion of the ultimate particles of polymer with diameters of from about 0.1 to about 4 microns. The term "microdisperse suspension" is employed in the present specification and claims to mean a suspension in which the particles or droplets of the internal phase have maximum diameters of about 50 microns.

The polyglycols and polyglycol ethers employed as suspension media in the present invention are of the ethylene and propylene glycol series and are liquid at room temperature and soluble in water to the extent of at least 2 percent by weight. Suitable polyglycols include diethylene glycol, triethylene glycol, higher polyethylene glycols of up to a molecular weight of about 600, dipropylene glycol, tripropylene glycol and higher polypropylene glycols of up to a molecular weight of about 1200 as well as mixtures of the foregoing. Suitable polyglycol ethers are the monoalkyl ethers of the above polyglycols wherein the alkyl group contains from 1 to 4 carbon atoms. Such polyglycols and polyglycol ethers have boiling points of at least about 185° C. at atmospheric pressure and those having normal boiling points of greater than 200° C. are preferred for the present purposes.

In carrying out the invention, the water-soluble or water-swellable polymer is prepared as a constituent of the aqueous phase of a microdisperse suspension of said aqueous phase in a liquid hydrocarbon or chlorinated hydrocarbon suspending medium, for example, by the methods of U.S. Pat. 2,982,749 or 3,284,393 which are incorporated herein by reference. In such operations an aqueous solution containing from about 10 percent to about 40 percent or more of at least one water-soluble, monoethylenically unsaturated monomer and a catalytic amount of a peroxide or azo compound, with or without a small amount of a polyunsaturated cross-linking agent, is dispersed in a liquid hydrocarbon or chlorinated hydrocarbon as a suspending medium with the aid of a dispersing or suspending agent and the resulting dispersion is preferably run through a colloid mill or other high shear mechanical homogenizer to obtain the suspension in microdisperse condition. The resulting mixture is then heated to a reaction temperature to initiate polymerization of the monomer or monomers in the aqueous phase. Alternatively, a reducing agent, such as an alkali metal sulfite, can be introduced into the system prior to or during heating to enhance the activity of the polymerization catalyst through a redox mechanism.

Suitable water-soluble monomers for preparing water-soluble or water-swellable polymers or copolymers include acrylamide, methacrylamide, acrylic and methacrylic acid and the alkali metal salts thereof, alkali metal styrenesulfonates or vinylsulfonates, hydroxyalkyl acrylates or methacrylates, sulfoethyl acrylate, vinyl-pyrrolidone, vinyl-oxazolidinone, vinylbenzylammonium salts, dimethylaminoethyl acrylate, aminoalkyl methacrylates and the like. Such monomers may be homopolymerized or two or more thereof may be copolymerized to produce water-soluble polymers. Alternatively, one or more of the foregoing monomers is copolymerized with from about 0.005 to about 0.1 percent, preferably from 0.01 to 0.05 percent, of a polyunsaturated cross-linking agent, the percentages being by weight and based on the total weight of monomers in the system. Copolymerization in this manner with a cross-linking agent produces water-swellable polymers which are particularly useful as thickening agents which do not lose viscosity under shearing conditions to the extent observed with most water-soluble thickening agents.

The polyunsaturated cross-linking agents employed in preparing the water-swellable polymers are organic compounds, soluble in the aqueous monomer solution to the extent of at least about 0.05 percent by weight and having in their molecules two nonconjugated sites of ethylenic unsaturation capable of taking part in a vinyl polymerization reaction. Exemplary cross-linking agents include divinylbenzenesulfonate, ethylene or propylene glycol diacrylate or dimethacrylate, allyl acrylate, diallyl or divinyl ether and the diallyl and divinyl ethers of ethylene glycol, diethylene glycol or triethylene glycol or the like. Preferred cross-linking agents are N,N'-methylene-bisacrylamide, N,N'-ethylidene-bisacrylamide, N,N'-methylene-bismethacrylamide and other lower alkylidene-bisacrylamides having up to four carbons in the alkylidene group.

Conventional catalysts for vinyl polymerization are employed. Suitable catalysts are capable of generating free radicals on being heated or when exposed to a redox agent. Such catalysts include alkali metal persulfates, tertiary alkylhydroperoxides, azobis-isobutyronitrile and the like.

The suspending medium employed as the external phase of the microdisperse suspension during the polymerization step may be any inert hydrophobic liquid boiling below about 200° C. Such an inert hydrophobic liquid will not dissolve to an appreciable extent in the internal, aqueous monomer phase of the suspension and is preferably inert with respect to the polymerization reaction. Of such liquids hydrocarbons and chlorinated hydrocarbons, such as solvent naphtha, light kerosine, toluene, xylene, ethylbenzene, chlorobenzene, o-dichlorobenzene, propylene dichloride, carbon tetrachloride, 1,1,1-trichloroethane, methylene chloride, tetrachloroethylene and the like, are advantageously employed and of these toluene, xylene and the chlorinated hydrocarbons are preferred.

In carrying out the polymerization reaction, after forming the microdisperse suspension of aqueous monomer solution in liquid hydrocarbon or chlorinated hydrocarbon, it is generally desirable to purge the mixture with an inert gas such as nitrogen to remove inhibitory oxygen and then to heat the mixture to a reaction temperature while employing vigorous agitation to maintain the suspension in microdisperse condition. The polymerization reacton is generally exothermic and care is required to avoid overheating. Cooling of the reaction vessel may be required during the initial, strongly exothermic reaction stage, but in general, the temperature of the reaction is conveniently controlled by carrying out the reaction at the boiling point of the suspending medium and under reflux. The desired reaction temperature of between 30° and 80° C. can thus be achieved by proper choice of suspending medium and by adjusting the pressure in the reaction vessel to control the boiling point of the medium in the desired range. Following the initial exotherm it is generally desirable to heat the reaction mixture at temperatures up to about 80° C. for a period of time to complete the polymerization reaction. During such period the refluxing condensate is passed through a water separator to remove water carried in the azeotropic mixture which distills from the reaction mixture while returning dewatered suspending medium to the reaction vessel. It is important to continue the azeotropic drying until the suspended polymer phase is essentially dry since any substantial residue of water in the polymer may cause gelling after subsequent addition of polyglycol.

Following the preparation of the microdisperse suspension of substantially dry polymer particles as set forth above, a predetermined amount of liquid polyglycol or polyglycol ether is added to said suspension to provide the desired proportion of such liquid to the polymer in the final water-dispersible composition. In general, it is desirable to employ at least a weight of liquid polyglycol or polyglycol ether equal to the weight of polymer in the existing suspension and preferably the weight of the added liquid polyglycol compound ranges from about 3 to about 8 parts of polyglycol compound to each 2 parts of polymer in the suspension. The polyglycol or polyglycol ether is chosen to have a boiling point higher than that of the polymerization suspending medium and after or during the addition of the polyglycol compound the resulting mixture is fractionally distilled either at atmospheric pressure or below to recover said polymerization suspending medium and to obtain the desired water-dispersible microdisperse suspension of polymer in polyglycol or polyglycol ether. In general, it is desirable to carry out the fractional distillation at a temperature not greater than about 120° C. and particularly with water-soluble polymers at a temperature not greater than about 100° C. The microdisperse suspensions of polymer in polyglycol or polyglycol ether is readily dispersible in water to obtain an aqueous solution if the suspended polymer is water-soluble or a dispersion of swollen microparticles if the suspended polymer is water-insoluble but water-swellable.

The following examples illustrate the invention but are not to be construed as limiting the same.

EXAMPLE I 567 grams of an aqueous solution containing 198 grams of sodium acrylate and 0.0099 gram (50 parts per million based on monomer) of tertiary butyl hydroperoxide was dispersed in 852 milliliters of xylene having dissolved therein 82.5 grams of a suspending agent consisting of a polystyrene which had been sulfonated to the extent of about 12 percent. The resulting mixture was fed to a Manton-Gaulin homogenizer operating at a pressure of 2500 pounds per square inch to produce a microdisperse suspension of microdroplets of the aqueous phase in the xylene suspending medium. The resulting microdisperse suspension was heated at 30° C. and purged with nitrogen for one hour to remove inhibitory oxygen. Five successive portions of an aqueous 2 percent by weight solution of sodium metabisulfite ($Na_2S_2O_5$) were added at intervals of 10 to 12 minutes to the suspension with vigorous agitation, each such portion being adjusted to provide 10 parts by weight of sodium metabisulfite per million parts of acrylate monomer in the initial reaction mixture. Addition of the bisulfite catalyzed the polymerization reaction which proceeded exothermically. On completion of the portionwise additions of bisulfite the mixture was heated at 50° to 55° C. for an additional hour with agitation to complete the polymerization. Thereafter the suspension was heated at 57° C. under a pressure of 40 millimeters of mercury to distill off an azeotropic mixture of xylene and water. The distillate was continuously condensed in a reflux condenser and passed through a sedimentation-type water separator to remove the water and return the xylene to the reaction vessel. When no further water was observable in the condensed distillate, 297 grams of tripropylene glycol was added to the suspension of polymer in xylene and the resulting mixture was heated for a period of time at a temperature of about 65° C. under a pressure of 5 millimeters of mercury to distill off and recover xylene and to obtain as a residue a microdisperse suspension of sodium polyacrylate in tripropylene glycol at a concentration of 40 percent polymer solids by weight. A portion of this suspension was poured into water with stirring and was found to disperse readily in the water and to produce in a short time a homogeneous aqueous solution of polymer with no residue of undissolved gels or agglomerates. A dilute aqueous solution of sodium polyacrylate prepared in this fashion was added dropwise with gentle mixing to an alkaline slurry of clay and was shown to be an efficient flocculating agent for the clay solids.

EXAMPLE 2

210 grams of acrylamide, 0.21 gram of pentasodium (carboxymethylimino)bis(ethylene-nitrilo)tetraacetic acid (Versenex 80), 0.105 gram of sodium metabisulfite and 0.105 gram of tertiary butyl hydroperoxide are dissolved in 840 grams of deionized water and sufficient sodium hydroxide added thereto to bring the mixture to a pH of 11.5. The resulting solution is mixed with an oil phase consisting of 20 milliliters of methanol and 6.3 grams of a chloromethylated polystyrene-dimethylamine reaction product, wherein about 5–10 percent of aromatic rings are aminated, dissolved in 1575 milliliters of xylene. The resulting mixture is sheared at high speed in a Waring Blendor for two minutes, placed in an agitated reactor and purged with nitrogen. The temperature of the reaction vessel and contents is raised to 63° C. over a period of one hour and thereafter held at about 52° C. for an additional 2.5 hours to complete the polymerization reaction. The resulting microdisperse suspension is then dewatered by azeotropic distillation as in Example 1, 630 grams of a polypropylene glycol having an average molecular weight of about 400 is added and the xylene is recovered by distillation to obtain as a residue a water-dispersible, microdisperse suspension of polyacrylamide microbeads in said polyglycol containing about 25 percent by weight of polymer solids. Microscopic studies show that almost all the poymer particles in the suspension are less than 4 microns in diameter. A portion of the suspension is dispered in water to produce an aqueous 0.1 percent by weight solution of polyacrylamide. The suspension disperses readily in water with gentle agitation and the polymer dissolves rapidly to form the desired solution. The polymer solution is added to a papermaking furnish to provide 0.02 percent by weight of polyacrylamide based on the weight of cellulosic fiber in the furnish. This treatment results in improved drainage rate in the manufacture of paper and the retention of fillers and fine fibers in the paper sheet is augmented.

EXAMPLE 3

To prepare a lightly cross-linked copolymer of acrylamide and sodium acrylate in microbead form, the general procedure of Example 2 was followed employing the following recipes for the aqueous phase and the oil phase, respectively.

Aqueous Phase

| Ingredient: | | |
|---|---|---|
| Acrylamide | grams | 168 |
| Acrylic acid | do | 42 |
| Water | do | 840 |
| Sodium carbonate | do | 63 |
| Sodium hydroxide, to pH 10. | | |
| Methylene-bisacrylamide | do | 0.042 |
| Sodium metabisulfite | do | 0.105 |
| Tertiary butyl hydroperoxide | do | 0.105 |
| Versenex 80 | do | 0.21 |

Oil Phase

| Ingredient: | | |
|---|---|---|
| Xylene | ml | 1575 |
| Suspending agent as in Ex. 2 | grams | 6.3 |
| Acrylic acid | do | 31.5 |

Dispersion of the aqueous phase in the oil phase, polymerization and azeotropic dewatering were carried out as in Example 2. A small portion of the resulting suspension of copolymer in xylene was filtered to separate the copolymer in the form of microbeads and the latter were washed with acetone and dried. The sorptive power of the polymeric beads to swell in aqueous fluid was measured and it was found that the copolymer held 82 grams of aqueous 0.27 molar sodium chloride solution per gram of copolymer.

To the remaining suspension of copolymer in xylene containing about 200 grams of copolymer there is added 200 grams of the monomethyl ether of diethylene glycol and the xylene is recovered by fractional distillation to obtain a microdisperse suspension of the copolymer in the polyglycol ether. This suspension disperses readily in water and shows very rapid thickening. Addition of 0.6 percent by weight of the suspension (containing 50 percent copolymer solids) to deionized water quickly raised the viscosity of the resulting mixture to about 10,000 centipoises as determined with a Brookfield viscosimeter using the No. 4 spindle at 4 r.p.m.

While it is preferred to employ at least one part by weight of polyglycol or polyglycol ether for each part of polymer in the final water-dispersible composition it is only necessary to employ sufficient polyglycol or polyglycol ether to assure that the ultimate composition is pourable. The required amount to obtain desired properties can be readily predetermined on a small test batch of any particular polymer suspension and is found to vary somewhat depending upon the particle size of the polymer in suspension. Thus, suspensions wherein the microdisperse particles of polymer have average diameters of less than one micron require at least about 3 parts of polyglycol per 2 parts by weight of polymer, that is the final composition contains a maximum of about 40 percent polymer solids. On the other hand when the particles of polymer have diameters in the range of 1 to 10 microns fluid compositions have been obtained with as little as about 1 part of polyglycol compound per 2 parts of polymer to provide final compositions containing from about 65 to 70 percent by weight of polymer solids.

If the fluid water-dispersible suspensions are to be stored for substantial periods it is generally desirable to incorporate from about 1 to about 5 percent by weight of a surfactant in the final composition to serve as a stabilizer. Good results have been obtained when employing nonionic surfactants such as the adduct of 9 to 10 moles of ethylene oxide with nonylphenol (Triton N–101), polyoxyethylene derivative of sorbitan monooleate (Tween 80) and the like, a cationic surfactant such as a polypropoxylated quaternary ammonium chloride (Emcol CC–36) or an anionic surfactant such as a sulfonate or disulfonate of decyldiphenyl ether (Dowfax 3B2).

I claim:

1. A method for preparing a fluid, water-dispersible suspension of water-soluble or water-swellable vinyl polymer which comprises preparing water-soluble or water-swellable polymer in the aqueous phase of a microdisperse suspension of aqueous droplets in a liquid hydrocarbon or chlorinated hydrocarbon, separating the water from said suspension by azeotropic distillation while maintaining the polymer in microdisperse suspension, adding a liquid polyglycol or polyglycol ether having a solubility of at least 2 percent by weight in water, said polyglycol or polyglycol ether being employed in a predetermined amount sufficient to maintain the polymer in fluid suspension and recovering the hydrocarbon or chlorinated hydrocarbon by distillation from the suspension.

2. A method according to Claim 1 wherein the polyglycol or polyglycol ether is employed in an amount of at least about 1 part by weight per 2 parts by weight of polymer in the suspension.

3. A method according to Claim 1 wherein the polyglycol or polyglycol ether has a boiling point of at least about 185° C. at atmospheric pressure.

4. A method according to Claim 1 wherein the polyglycol is diethylene glycol or a higher polyethylene glycol of up to a molecular weight of about 600 or dipropylene glycol or a higher polypropylene glycol of up to a molecular weight of about 1200.

5. A method according to Claim 1 wherein the polymer is a homopolymer or copolymer of acrylamide or acrylic acid.

6. A method according to Claim 1 wherein the polymer is a homopolymer or copolymer of acrylamide, the hydrocarbon is xylene and the polyglycol is tripropylene glycol.

7. A method according to Claim 1 wherein the polymer is a homopolymer or copolymer of acrylic acid, the hydrocarbon is xylene and the polyglycol is tripropylene glycol.

References Cited

UNITED STATES PATENTS

| | | | |
|---|---|---|---|
| 2,982,749 | 5/1961 | Friedrich | 260—29.6 HN |
| 3,284,393 | 11/1966 | Vanderhoff | 260—34.2 |
| 3,468,322 | 9/1969 | Katzer | 260—705 |
| 3,661,835 | 5/1972 | Baker | 260—34.2 |
| 3,763,071 | 10/1973 | Katzer | 260—33.2 R |
| 3,657,182 | 4/1972 | Jolly | 260—33.4 R |

ALLAN LIEBERMAN, Primary Examiner

P. R. MICHL, Assistant Examiner

U.S. Cl. X.R.

260—29.6 E, 29.6 HN, 29.6 SQ, 33.4 R, 34.2